United States Patent Office 2,720,350
Patented Oct. 11, 1955

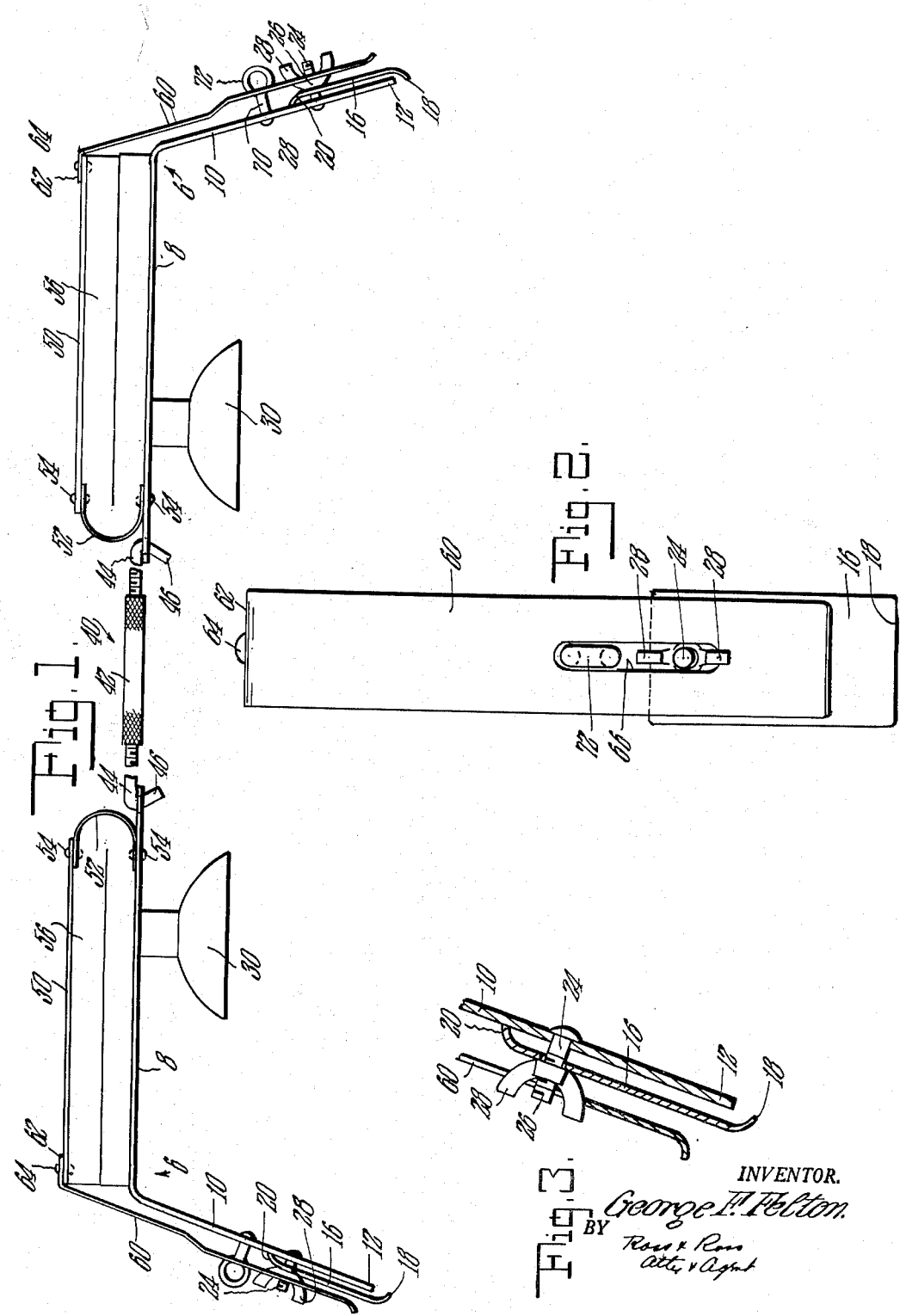

2,720,350

COMBINATION SKI-RACK AND POLE CARRIER

George F. Felton, Millers Falls, Mass.

Application August 13, 1953, Serial No. 374,033

1 Claim. (Cl. 224—42.1)

This invention relates to improvements in carrying apparatus and is directed more particularly to the provision of a unique and novel apparatus adapted for attachment to the upper roof portion of a vehicle body for carrying fishing poles, skis and the like whereby the same are held and carried in an out-of-the-way position on top of the automobile.

It is the principal object of the invention to provide a carrying apparatus which is constructed for ready and easy attachment to or removal from an automobile and arranged for adjustment to firmly clamp various objects. It comprises a simple but efficient clamp means which is economical in its manufacture and simple in its operation.

It is a further object of the invention to provide a construction which is capable of quick and easy attachment upon and removal from a vehicle or other object.

It is a still further object of the invention to provide a relatively simple, practical and inexpensive device which includes a plurality of relatively yieldable arm members which are so arranged as to receive and grip skis, fishing rods or similar articles.

A further object of the invention is to provide a clamp and carrier means that will perform its intended function without scratching or marring the finish of the car or the articles being engaged and carried by the clamps, and further, to provide carriers of the character referred to which firmly hold the articles in straight position so as to eliminate opportunity for curvature or set thereof while being transported and still further to locate the entire construction on the top of a vehicle in such manner that the opening and closing of the doors thereof is in no wise interfered with.

All of the above objects are accomplished by means of such structure and relative arrangements of parts thereof, as will fully appear by a perusal of the description below and by various specific features which will be hereinafter set forth.

To the above cited and other ends and with the foregoing and various other novel features and advantages and other objects of the invention as will become more readily apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of a carrying apparatus embodying the novel features of the invention;

Fig. 2 is an end elevational view of the device shown in Fig. 1; and

Fig. 3 is a longitudinal view of the lower end portion of the structure shown in Fig. 2.

Referring now to the drawing more in detail, and referring more particularly to the preferred form of my invention selected for illustrative purposes, I have shown a support 6 formed from a strip of metal and having an upper horizontally disposed portion 8 and a vertical angularly disposed leg portion 10 depending downwardly therefrom.

In one non-limitative embodiment of the invention, the lower end 12 of the leg portion 10 may be of such dimension and configuration as to be suitably adapted for abutting the inner side of a rain gutter of the conventional form which runs along the upper portion of the side of an automobile roof and such as is shown in patent #2,288,442 issued to me on June 30, 1942.

A clamp plate 16 has a lower curving portion 18 for bearing on the outer side of the aforementioned gutter. An upper curving portion 20 of the plate 16 abuts the leg portion 10.

A screw 24 fixed to the leg portion 10 extends through an opening centrally of the plate 16 and a wing nut 26, having a pair of wings 28 and 28, on the outer side of the plate 16 is threadedly engageable with the screw 24 and bears on the plate 16 for clamping the rain gutter between the plate 16 and the leg portion 10.

A suction cup 30 is fixed to the horizontal portion 8 and depends downwardly therefrom for engaging a portion of the roof of an automobile in the well known manner.

At the inner extremity of the horizontal portion 8, a centrally disposed opening may be provided for employment when two pairs of the device are called into play. It is to be understood that one pair of the devices of this invention may be used in the conventional aligned manner forwardly and rearwardly of an automobile roof on one side thereof. By means of this invention, it is also contemplated that two pairs of the device of this invention may be used in a manner such as best shown in Fig. 1 and now to be described.

That is, a pair of the devices may be disposed on opposite sides of the automobile roof and forwardly thereof, and another similar pair may be disposed on opposite sides of the roof and rearwardly thereof. It will be understood that the devices forwardly of the roof and the devices rearwardly of the roof will be aligned as to each other that they may be joined by means of a turnbuckle, generally designated by 40 comprising an intermediate hand engaging member 42 and the oppositely disposed screw members 44 and 44 threadedly engageable therewith in the conventional turnbuckle manner. The outer free extremities 46 and 46 consist of hook portions which are receivable through the related openings at the inner extremities of the horizontal portions 8.

Thus it will be appreciated that the turning of the member 42 of the turnbuckle will serve to pull the supports 6 and 6 toward each other in a tightening manner or to release the tension upon same whereby upon proper loosening the turnbuckle may be disengaged from the supports and the supports themselves may be removed from the vehicle.

A horizontally disposed clamping bar 50 is disposed over the horizontal portion 8 of each support in a spaced relation and has an inner end portion thereof connected to the horizontal portion 8 by means of a spring member 52. The spring member 52 is secured at its opposite extremities to the related component by means of rivets 54 or the like.

The inner adjacent sides of the members 50 and 8 have secured thereto as by an adhesive or the like portions of a pad 56 formed from resilient material such as sponge rubber or the like and which is folded into a U-shape with the open end of the U outermost. Thus when the member 50 is moved from the normal operating position shown in Fig. 1 to a loading and/or unloading position subsequently to be described, the inner faces of the opposed portions of the pad 56 are separated.

By means of the pad, scratching of the materials being gripped thereby is obviated.

To hold member 50 in the operating position relative to the support 6 as shown in Fig. 1, a locking bar 60 is provided having an upper angularly disposed extremity 62 which is secured to the free outer end of the member 50 by means of a rivet 64 or the like.

The lower free end of the bar 60 is provided with a longitudinally disposed elongated slot 66 which is adapted to be slipped over the aligned wings 28 and 28 of the wing nut 26 in a manner best shown in Fig. 2. That is to say, by exerting a slight downward pressure upon the sponge pad 56, the member 60 may be extended downwardly whereby the wing nut 26 is receivable through the slot 66. Being so received, the underside of the lowermost wing 28 of the nut 26 provides a shoulder against which the bar 60 abuts when the manual engagement of the structure is released, the spring 52 urging the clamping bar 50 and the locking bar 60 upwardly against the action of the wing nut 26 whereby the desired locking action is achieved.

Additionally a locking member may be provided having a post portion 70 secured to the leg portion 10 and an eye portion 72 receivable through the slot 66 in the locking bar 60. A lock of the conventional design may be passed through the eye 72 whereby the structure may be held in the desired locked position to insure against pilferage.

The spring 52 being of spring metal or a similar yielding material, the support 6 and the members 50 and 60 are adapted to be urged away from each other.

After insertion of the item to be gripped between the opposite portions of the sponge pad 56, the members 50 and 60 may be brought into the desired locking position relative to the support 6.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A carrying device for extending transversely of and attaching to an automobile roof having a top portion and side portions curving outwardly and downwardly from opposite sides thereof and provided with gutters along said side portions comprising, separate aligned lower holding members formed from strips of flat relatively rigid metal having inner ends spaced apart, threaded hooks engaging adjacent inner ends of said lower holding members and a member engaging said threads forming with said hooks a turnbuckle mechanism, elongated clamp strips of relatively rigid metal extending downwardly from outer ends of said holding members for engaging said gutters, eyes extending outwardly from said clamp strips, upper holding members over said lower holding members, flexible and curving metal strips connected at opposite ends to inner ends of said upper and lower holding members hingedly and flexibly connecting and spacing said lower and upper members apart, inner adjacent faces of said upper and lower holding members provided with resilient cushioning material, flexible metal straps having inner ends secured to outer ends of the upper holding members and extending downwardly therefrom to overlie said elongated strips and provided with openings for the passage therethrough of said eyes whereby said straps may be held against movement away from said clamp strips by an implement in said eyes, and suction cups secured to undersides of said lower holding members for engaging said roof.

References Cited in the file of this patent
UNITED STATES PATENTS

| | | |
|---|---|---|
| 2,222,636 | Strauss | Nov. 26, 1940 |
| 2,480,353 | Bjork | Aug. 30, 1949 |
| 2,529,285 | Felton | Nov. 7, 1950 |
| 2,575,458 | Merrill | Nov. 20, 1951 |
| 2,603,394 | Beck | July 15, 1952 |
| 2,630,257 | Nielsen | Mar. 3, 1953 |